United States Patent
Durand et al.

(10) Patent No.: US 9,862,843 B2
(45) Date of Patent: Jan. 9, 2018

(54) METAL-OXIDE NANOFILLER, METHOD FOR SYNTHESISING SAME, AND USE THEREOF IN A FLUOROCARBON-RESIN NON-STICK COATING

(75) Inventors: Nelly Durand, Mulhouse (FR);
Bernard Boutevin, Montpellier (FR);
Bruno Ameduri, Montpellier (FR);
Cedric Loubat, Vendargues (FR);
Barbara Gantillon, Poisy (FR);
Jean-Luc Perillon, Saint Paul Trois Chateaux (FR)

(73) Assignees: SEB S.A., Ecully (FR); Ecole Nationale Superieure de Chimie de Montpellier, Montpellier (FR); Specific Polymers, Clapiers (FR)

( * ) Notice: Subject to any disclaimer, the term of this patent is extended or adjusted under 35 U.S.C. 154(b) by 1082 days.

(21) Appl. No.: 13/990,431

(22) PCT Filed: Nov. 30, 2011

(86) PCT No.: PCT/FR2011/052829
§ 371 (c)(1),
(2), (4) Date: Oct. 7, 2013

(87) PCT Pub. No.: WO2012/072953
PCT Pub. Date: Jun. 7, 2012

(65) Prior Publication Data
US 2014/0034651 A1    Feb. 6, 2014

(30) Foreign Application Priority Data
Nov. 30, 2010 (FR) ................................ 10 59949

(51) Int. Cl.
C09C 1/30 (2006.01)
C09D 7/12 (2006.01)
(Continued)

(52) U.S. Cl.
CPC .......... C09D 7/1233 (2013.01); A47J 36/025 (2013.01); B82Y 30/00 (2013.01); C09C 1/309 (2013.01);
(Continued)

(58) Field of Classification Search
CPC ..... C09C 1/3072; C09C 1/3081; C09C 1/309; C09C 1/407; C09C 3/006; C09C 3/10;
(Continued)

(56) References Cited

U.S. PATENT DOCUMENTS 4,715,986 A    12/1987  Gruning et al.
7,695,814 B2    4/2010  Gartstein et al.
(Continued)

FOREIGN PATENT DOCUMENTS

EP    0974404 A2    1/2000
EP    1103581 A2    5/2001
(Continued)

*Primary Examiner* — Yan Lan
(74) *Attorney, Agent, or Firm* — The Webb Law Firm

(57) ABSTRACT

Provided is a metal-oxide nanofiller including at least two graft chains, at least one of the chains being hydrophilic and the other being a hydrophobic chain compatible with fluorinated polymers. The hydrophobic chain is an oligomer, the weight-average molar mass Mw of which is between 300 and 20,000 g/mol$^{-1}$. Also provided is a non-stick coating comprising such a filler, as well as to a culinary article provided with such a coating.

9 Claims, 2 Drawing Sheets

(51) Int. Cl.
  *A47J 36/02* (2006.01)
  *B82Y 30/00* (2011.01)
  *C09C 1/40* (2006.01)
  *C09C 3/00* (2006.01)
  *C09C 3/10* (2006.01)
  *C09C 3/12* (2006.01)
  *B05D 5/08* (2006.01)

(52) U.S. Cl.
  CPC .......... *C09C 1/3072* (2013.01); *C09C 1/3081* (2013.01); *C09C 1/407* (2013.01); *C09C 3/006* (2013.01); *C09C 3/10* (2013.01); *C09C 3/12* (2013.01); *B05D 5/083* (2013.01); *C01P 2002/86* (2013.01); *C01P 2004/61* (2013.01); *C01P 2004/62* (2013.01); *C01P 2004/64* (2013.01); *C01P 2006/12* (2013.01)

(58) Field of Classification Search
  CPC ....... C09C 3/12; B82Y 30/00; C01P 2002/86; C01P 2004/61; C01P 2004/62; C01P 2004/64; C01P 2006/12; A47J 36/025; C09D 7/1233
  See application file for complete search history.

(56) References Cited

U.S. PATENT DOCUMENTS

| | | | |
|---|---|---|---|
| 7,951,526 | B2 | 5/2011 | Hayashi |
| 8,216,674 | B2 | 7/2012 | Simpson et al. |
| 2007/0190327 | A1* | 8/2007 | Gartstein ................. A61K 8/11 428/405 |
| 2009/0092923 | A1* | 4/2009 | Hayashi ................ B41C 1/1008 430/280.1 |
| 2010/0021745 | A1* | 1/2010 | Simpson ............... C09C 1/3081 428/428 |

FOREIGN PATENT DOCUMENTS

| | | |
|---|---|---|
| GB | 788151 A | 12/1957 |
| JP | 60-219288 A | 11/1985 |
| JP | 05-261266 | 10/1993 |
| JP | 08-143789 | 6/1996 |
| JP | 09-002815 | 1/1997 |
| JP | 10-273617 | 10/1998 |
| JP | 2001-152050 | 6/2001 |
| JP | 2009-198777 | 9/2009 |
| JP | 2012-056892 | 3/2012 |
| WO | 2007095106 A1 | 8/2007 |

\* cited by examiner

METAL-OXIDE NANOFILLER, METHOD FOR SYNTHESISING SAME, AND USE THEREOF IN A FLUOROCARBON-RESIN NON-STICK COATING

CROSS REFERENCE TO RELATED APPLICATIONS

The present application is the United States national phase of International Application No. PCT/FR2011/052829 filed Nov. 30, 2011, and claims priority to French Patent Application No. 1059949 filed Nov. 30, 2010, the disclosure of which is incorporated herein by reference in its entirety.

BACKGROUND OF THE INVENTION

Field of the Invention

The present invention generally relates to a nanoparticulate filler (or nanofiller) of a metal-oxide such as silica, and its usage in a fluorocarbon resin-based aqueous dispersion. The present invention also relates to a non-stick coating comprising such a filler, as well as to a culinary article provided with such a coating.

The synthesis of the nanofiller and the manner in which to achieve the non-stick coating and culinary article are also concerned.

Description of Related Art

The main purpose of the present invention is to introduce as delicately as possible a filler in the form of metal-oxide nanoparticles such as silica in fluorocarbon resin-based non-stick coatings, such as for example polytetrafluoroethylene, (PTFE). For this, it is essential to make the filler (particularly the silica) compatible with the fluorocarbon resin particularly when is in the form an of emulsion comprising a continual aqueous phase and a discontinuous phase constituted by the resin. In fact, the fluorocarbon resin-based non-stick coatings are initially prepared from such emulsions, then are applied onto a substrate and fritted.

A solution known by the skilled person consists in improving the compatibility of the silica nanoparticles with the PTFE by grafting to it a fluorinated chain, such as for example a poly(HEPO)silane which makes the nanoparticles compatible with the PTFE.

However, the major drawback of a silica modified by a poly(HEPO)silane is that it is too hydrophobic and cannot be used in the dispersion formulations of PTFE typically used to achieve non-stick coatings or textile impregnation products. In fact, it is not possible to disperse such a silica in an aqueous medium, and hence much less so in a PTFE emulsion.

The technical issue sought to be resolved by the present invention hence consists more particularly in making the silica (or any other metal oxide usable as a filler in an aqueous dispersion of fluorocarbon resin) compatible with the PTFE (hence hydrophobic), but also dispersible in aqueous medium.

SUMMARY OF THE INVENTION

In order to resolve this technical issue, the applicant has implemented a metal-oxide nanoparticle synthesis method, which not only comprises the grafting of a chain compatible with the PTFE (or any other fluorocarbon resin usable within the scope of the present invention), for example poly(HEPO)silane, but also the grafting of a polyalkylene glycol-based second chain modified by a silane.

The applicant has discovered surprisingly that this method leads to an unexpected and surprising effect: the two grafts can coexist simultaneously on the same particle, without rejection from any of them. In fact, one would have expected that once grafted by the hydrophilic and hydrophobic chains, the particle would reject the graft of opposite nature.

One thus obtains a nanofiller (particularly of silica), that is perfectly wettable and which is easily incorporated into the dispersion. Furthermore, this nanofiller also has surfactant characteristics which allow it to super-stabilize the PTFE dispersions.

The present invention relates to a nanofiller of a metal-oxide comprising at least two graft chains, at least one of the chains being hydrophilic and the other being a hydrophobic chain compatible with fluorinated polymers.

According to the invention, the hydrophobic chain is an oligomer, the weight-average molar mass Mw of which is between 300 and 20.000 g/mol$^{-1}$.

Preferably, the weight-average molar masses Mw of the hydrophobic chain are between 500 and 10.000 g/mol$^{-1}$, and better between 1000 and 5000 g/mol$^{-1}$. More preferably, the weight-average molar masses Mw of the hydrophobic chain are comprised between 1000 and 1500 g/mol$^{-1}$.

By nanofiller, is meant within the meaning of the present invention, a filler that comes in the form of nanoparticles whereof one of the dimensions ranges between 5 and 2000 nm, preferably between 20 and 200 nm, and better still between 10 and 100 nm.

By way of metal oxide usable in the non-stick coating according to the invention, one may particularly name silica, alumina, cerium oxide, zinc oxide, vanadium oxide and zirconium oxide, and titanium dioxide. The preferred metal oxide is silica, and particularly colloidal silica or pyrogenic silica.

Advantageously, the hydrophilic chain is a derivative of polyalkylene glycol modified by:
either an alkoxysilane,
or an acid or a phosphoric ester,
or an acid or phosphinic ester,
or a carboxylic acid.

Preferably, the hydrophilic chain is a derivative of polyethylene-glycol (PEG) or a derivative of polypropylene-glycol (PEG), and better still a derivative of polyethylene glycol (PEG) or polypropylene glycol (PPG) modified by an alkoxysilane (particularly a triethoxysilane or a trimethoxysilane).

Regarding the hydrophobic chain, according to a first particularly advantageous embodiment of the present invention, it is an HFPO oligomer modified by an alkoxysilane.

According to other equally advantageous embodiments of the invention, it is also possible to use vinylidene fluoride (VDF), tetrafluoroethylene (TFE) or VDF-TFE co-oligomers, VDF-hexafluoropropylene, VDF-chlorotrifluoroethylene, alone or mixed and modified by an alkoxysilane.

A preferred nanofiller may be constituted of silica comprising two graft chains:
one of the chains being a hydrophilic chain consisting in a derivative of polyethylene glycol modified by a triethoxysilane, and
the other chain being an oligomer of the hexafluoropropylene oxide (HFPO) modified by a triethoxysilane or a methyldiethoxysilane.

The present invention also relates to a dispersion in aqueous phase of at least a fluorocarbon resin comprising a nanofiller according to the invention.

The fluorocarbon resin used in the dispersion according to the invention may be advantageously selected amongst the polytetrafluoroethylene (PTFE), the copolymer of tetrafluoroethylene and perfluoro propylvinylether (PFA), and the copolymer tetrafluoroethylene and hexafluoropropylene (FEP), the polyvinylidene fluoride (PVDF), the MVA (copolymer of TFE/PMVE), the terpolymer TFE/PMVE/FAVE, the ETFE and their mixtures.

The dispersion according to the invention may further comprise, the fluorocarbon resin and the nanofiller, pigments (for example carbon black, iron oxides, mixed oxides of cobalt and manganese or even titanium dioxide), and/or additives selected among the thickening agents, surfactants, stabilizers and cosolvents.

The present invention also relates to a method of synthesis of a silica nanofiller comprising a hydrophilic chain consisting in a derivative of polyalkylene glycol modified by an alkoxysilane and a hydrophobic chain consisting in a HEPO hydrophobic oligomer, and/or a VDF and/or a TFE modified by an alkoxysilane, said method comprising the following steps:
   providing a polyalkylene glycol modified by an alkoxysilane;
   the oligomerization of said hydrophobic oligomer, followed by its functionalization by an alkoxysilane;
   the grafting onto the silica nanofiller on the one hand of said hydrophobic oligomer functionalized by an alkoxysilane, and on the other hand of the polyalkylene glycol modified by an alkoxysilane.

The metal-oxide is such as defined beforehand, and the same holds true for the functionalized and modified HFPO oligomer and PEG.

According to a first advantageous embodiment of the synthesis method of the nanofiller of the present invention, the grafting is a two-step grafting, in which:
   first, the grafting of the functionalized HFPO oligomer is achieved on the silica nanofiller; then
   second, the grafting of the modified polyalkylene glycol is achieved on the silica nanofiller.

According to a second advantageous embodiment of the method of synthesis of the nanofiller of the present invention, the functionalized HFPO oligomer and the modified polyalkylene glycol are simultaneously grafted onto the silica nanofiller.

According to a third advantageous embodiment of the method of synthesis of the nanofiller of the present invention, the grafting of the HFPO and PEG oligomers is achieved by amidation of the oligo(HFPO)ester with the polyethylene glycol) w-amines.

The present invention further relates to a non-stick coating comprising a least one layer comprising at least a fluorocarbon resin alone or mixed with a thermally stable bonding resin and resistant to at least 200° C., this (these) resin(s) forming a continuous fritted lattice, said non-stick coating being characterized in that it comprises a nanofiller according to the invention.

Such a non-stick coating has improved corrosion resistant, abrasion-resistant and non-stick properties as is illustrated in the examples.

The fluorocarbon resin is such as defined before.

The bonding resin may advantageously be selected among polyamide-imids (PAI), polyether-imids (PEI), polyamids (PA), polyimids (PI), polyetherketones (PEK), polyetheretherketones (PEEK), polythersulfones (PES), polyphenylene sulfides (PPS), polybenzimidazoles (PBI).

Advantageously, the non-stick coating according to the invention comprises a layer of primer base and at least a finishing layer, each comprising at least a fluorocarbon resin alone or mixed with a thermally stable bonding resin resistant to at least 200° C. The nanofiller may be indifferently included in one or the other of the prime and finishing layers, but is preferably included in the prime layer.

Last, the present invention relates to a culinary article comprising a support exhibiting an inner side able to receive foods and an outer side intended to be disposed towards the source of heat, characterized in that the inner side is coated with a non-stick coating according to the invention.

By way of support usable for achieving the culinary article according to the invention, a hollow bowl will be advantageously be used as previously described, exhibiting a base and a lateral wall rising from the base.

The usable support within the framework of the present invention will advantageously be achieved in a material selected from amongst metals, wood, glass, plastic and ceramic materials.

By way of metal supports usable in the method according to the invention, it may advantageously be cited aluminum supports or aluminum alloys, anodized or not, or in polished, brushed or microbeaded aluminum, or in polished, brushed or microbeaded stainless steel or cast aluminum, or in beaten or polished copper. Multilayer composite supports can also be cited, for example aluminum (or aluminum alloy)/stainless steel bi-layer supports and stainless steel/aluminum (or aluminum alloy)/stainless steel tri-layer supports.

The culinary article according to the invention is achieved according to the following method, which comprises the following steps:
   a step of introducing a nanofiller according to the invention such as previously defined in a dispersion in aqueous phase of fluorocarbon resin, then
   a step of applying on a substrate said dispersion comprising the fluorinated polymer and said nanofiller.

BRIEF DESCRIPTION OF THE DRAWINGS

Other advantages and features of the present invention will result from the following description, given by way of non limiting example and made with reference to the examples and accompanying figures.

DETAILED DESCRIPTION OF THE INVENTION

Figure 2:
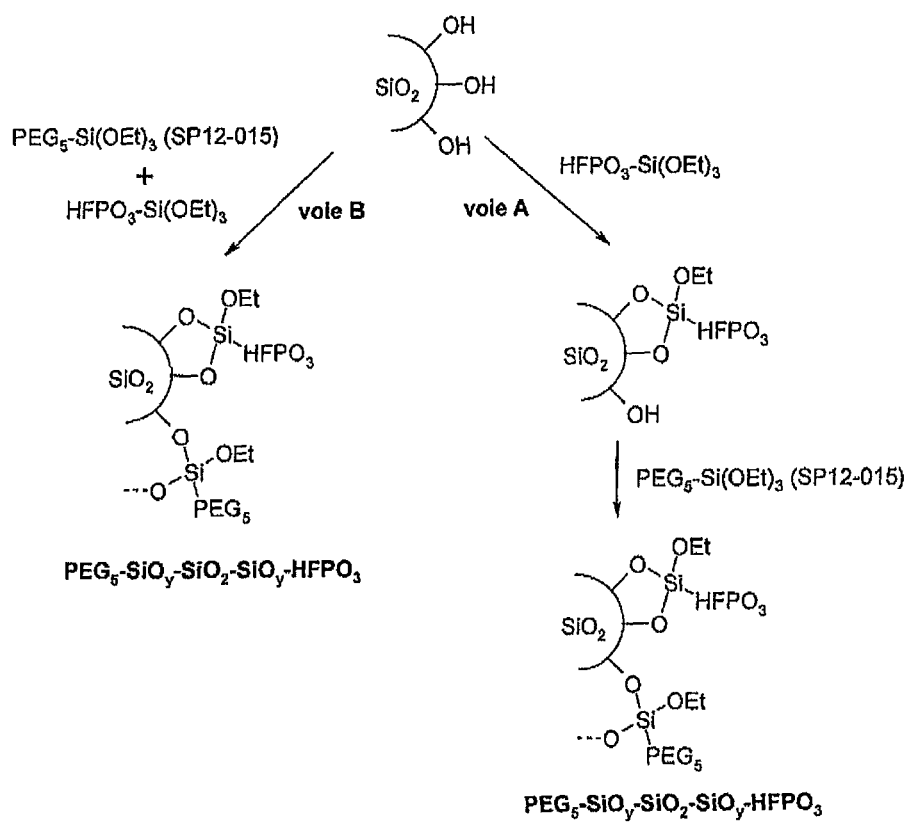
FIG. 2 schematically represents the reaction scheme of the synthesis of the silica nanofiller of example 1A (route A) and 1B (route B).

FIG. 2 is commented in example 1.

Figure 1:
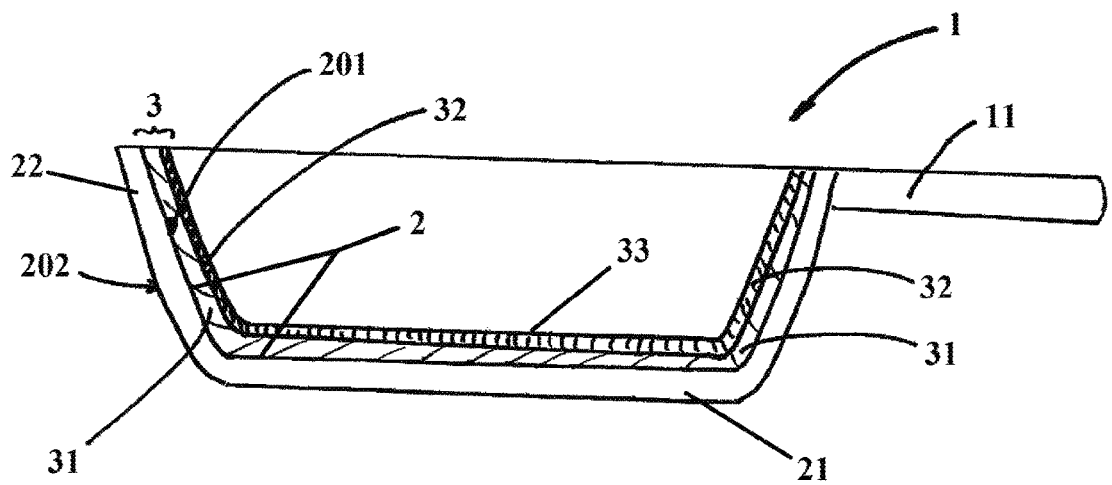
FIG. 1 represents a schematic cross-sectional view of an example of culinary article in accordance with the invention, exhibiting a non-stick coating on its inner surface.

FIG. 1 particularly represents, by way of culinary article example a pan 1 with a grip handle 11, which comprises a hollow metal bowl 2 having a base 21 and a lateral wall 22 rising from the base 21.

The bowl 2 exhibits a concave inner side 201 intended to be disposed on the side of food liable to be introduced therein, and an outer side 202 intended to be arranged towards a source of heat (for example a cooking plate).

The inner side 201 is covered with a non-stick coating 3, which comprises a layer of primer base 31 covering the inner side 201, and a finishing layer 32 covering the layer of primer base 31. The prime 31, finishing 32 and decorative layers 33 are PTFE-based.

EXAMPLES

Products
Supports
- aluminum supports sanded on its two main sides (having a measured arithmetic mean roughness Ra comprised between 4 and 6 μm);
- smooth, merely degreased aluminum supports.

Fillers
- colloidal silica commercialized under trade name LUDOX AM 30 by company GRACE DAVISON: it is an unmodified colloidal silica surface with a specific surface area of approximately 220 m$^2$/g and presented in the form of an aqueous dispersion with 30% dry matter, the size of the particles is estimated at 50 nm;
- pyrogenic silica commercialized under trade name AEROSIL 150 by company EVONIK with a specific surface area of approximately 150 m$^2$/g in solid form the size of the particles is estimated at 14nm;
- monomer: HFPO (having a purity of 97%) under name commercialized by ABCR;
- vinylidene fluoride (VDF);
- polyethylene glycol;
- polyethylene glycol amine commercialized under trade name Jeffamine® 1000 by company HUNTSMAN;
- methoxy-PEG-triethoxysilane oligomer of formula $CH_3\text{-}O\text{-}(CH_2CH_2O)_9\text{-}(CH_2)_3\text{-}Si(Oet)_3$ commercialized by company SPECIFIC POLYMERS.

Pigments
- pigment flakes (mica and titanium oxide) commercialized by company MERCK under brand names Iriodin 153 and 225:

Tests
Evaluating the Stability of a PTFE Dispersion with a Silica-Based Filler

It consists in evaluating the stability of the viscosity of a primer formulation applied by spraying PTFE-based spray comprising a silica filler (colloidal silica or silica nanofiller according to the invention) by BYK-Gardner cup according to DIN EN ISO 2433/ASTM D5125 standard:
- use of a 2.5 cup for the primers applied by spraying and measurement of the dry flow time (which corresponds to a viscosity) of the liquid and at ambient temperature in the orifice of calibrated diameter
- follow-up of the development of the viscosity by the measurement of the dry flow time and at ambient temperature straight after the formulation of the primer and follow up of the development of this viscosity over time at ambient temperature;
- follow-up of the development of the viscosity by measurement of the dry flow time and at ambient temperature straight after the formulation of the primer and stoving at 40% C of the formulated primers;
- then follow-up of the development time of the flow time hence of the viscosity, which is measured at ambient temperature.

Evaluating the Abrasion Resistance

The abrasion resistance of a non-stick coating on a sanded aluminum substrate is evaluated.

This test realized in accordance with the AFNOR NF D21-511 $3.3.7 standard consists:
- on the one hand in evaluating the scratch resistance of the prime layer by subjecting it to a green abrasive pad of SCOTCH BRITE type (registered trademark), the scratch resistance being estimated quantitatively by the number of passages with the pad needed to create the first scratch mark (corresponding to the appearance of the support constitutive metal); and
- on the other hand in evaluating the loss of the non-stick property of the prime layer throughout the test, the latter being quantitatively estimated by the number of cycles carried out until the loss of the non-stick property of the prime layer (test using carbonized milk—in accordance with the NF D 21-511 standard): the latter is measured according to the more or less easy cleaning of the carbonized milk. The notation is as follows:

100: means that the film of carbonized milk is entirely removed by simple application of a water jet from a kitchen tap;
50: means that circular movements need to be carried out on the object under the water jet in order to entirely unstick the carbonized film;
25: means that a 10-minute soak is needed and possibly forcing the removal by wiping with a wet sponge to completely remove the film;
0: means that after the previous process, all or part of the carbonized film remains stuck.

Evaluating the Adherence of a Non-stick Coating on a Smooth Aluminum Substrate

This test is carried out by grid pattern in accordance with the ISO 2409 standard, followed by a 9 hour immersion of the article (by 3 cycles of 3 hours in boiling water).

Then, a check is carried out to see whether the non-stick coating exhibits a detachment or not. The notation is as follows:
- to obtain a notation of 100, no square should become unstuck (excellent adherence);
- in the event of un-sticking the value recorded is equal to 100 minus the number of unstuck squares.

Evaluating the Corrosion Resistance of the Prime Layer on a Smooth Aluminum Substrate The corrosion resistance of a non-stick coating is evaluated deposited on an aluminum substrate, by evaluating its resistance to the diffusion of salt towards the metal substrate which corrodes. This evaluation is carried out in practice by immersion, during 20 hours, of the substrate coated with the prime layer, in a saline aqueous solution brought to a boil. This saline solution comprises 10% in weight of sodium chloride. The protocol of this test is that defined in the AFNOR NF D21-511 $ 3.3.5. standard.

Following each immersion, a visual check is carried out of the final aspect of the coating, consisting in marking the presence or absence of corrosion traces (by visual observation with the naked eye or with the binocular magnifier). It consists in practice to detect the possible presence of traces such as blisters with area extension, white traces under the coating. This observation is followed by a cross-cut test in accordance with the ISO 2409 standard.

Comparative Example 1A (with Colloidal Silica)

A primer base composition CPC1A is achieved including the following compounds, their respective quantities being indicated in g for 1000 g of composition:

| | |
|---|---|
| PFA (50% dry matter) | 92 g |
| PTFE dispersion (60% dry matter) | 226 g |
| Carbon black dispersion (25% dry matter) | 41 g |
| PAI in aqueous phase + solvent (NMP) (9.5% dry matter) | 434 g |
| Alkylphenol ethoxyl-based non-ionic surfactant (13%) | 21 g |

-continued

| | |
|---|---|
| Colloidal silica (30% dry) | 62 g |
| NH$_4$OH (d = 0.9) | 2 g |
| Water | 123 g |
| Total | 1000 g |

Comparative Example 1B (with Pyrogenic Silica)

A primer base composition CPC1B is achieved including the following compounds, their respective quantities being indicated in g for 1000 g of composition:

| | |
|---|---|
| PFA (50% dry matter) | 78 g |
| PTFE dispersion (60% dry matter) | 192 g |
| Carbon black dispersion (25% dry matter) | 39 g |
| PAI in aqueous phase + solvent (NMP) (9.5% dry matter) | 590 g |
| Pyrogenic silica | 24 g |
| Alkylphenol ethoxyl-based non-ionic surfactant (3.7%) | 70 g |
| NH$_4$OH (d = 0.9) | 7 g |
| Total | 1000 g |

A finishing composition CF1 (colorless and without silica) is further achieved comprising the following compounds, their respective quantities being indicated in g for 1000 g of composition:

| | |
|---|---|
| PTFE dispersion (60% dry) | 844 g |
| PFA dispersion (50% dry) | 5 g |
| Carbon black (25% dry) | 0.2 g |
| Octylphenol 11 mole ethoxylate: | 3.7 g |
| Sodium lauryl sulfate: | 3.2 g |
| Water: | 47.6 g |
| Xylene: | 38.7 g |
| Acrylique copolymer >95%: | 5.1 g |
| Oleic acid: | 1.1 g |
| triethanolamine: | 1.3 g |
| Iriodin 153: | 2 g |
| Propylene Glycol: | 12.1 g |
| WATER | 35.9 g |
| Total | 1000 g |

One side of the aluminum substrates is typically coated (sanded or smooth depending on the tests to be carried out) by proceeding as follows:
- a finished layer of the CPC1A or CPC1B composition is sprayed onto this inner side;
- the thus formed wet prime layer is then dried at a temperature of around 65% until it is no longer sticky;
- the finishing composition CF1 is then sprayed onto the primer layer;
- after drying, curing the assembly at a temperature of the order of 420° C. +/−10° C.

It is obtained substrates coated with a non-stick coating, wherein the colloidal silica is found in the prime layer. The thus obtained pieces then undergo the set of previously mentioned tests in the present application.

The results obtained following these different tests are collected in table 1 of results hereinafter.

Comparative Example 2

It is sought to achieve a prime composition identical to the CPC1A composition, but by replacing the colloidal silica by a pyrogenic silica (CPC1B composition) comprising a hydrophobic chain constituted of an HFPO oligomer.

The grafting of the hexafluoropropene oxide (HEPO) on the silica is carried out by hydrolysis-condensation of hexafluoropropene oxide (HEPO) oligomers.

First, anionic addition polymerization is carried out by opening the hexafluoropropene oxide (HEPO) cycle as follows:
- the polymerization has been carried out in a Hastelloy reactor of 100 mL (HC-276) fitted with a mechanical agitator, a rupture disk, valves and a manometer;
- after heating the reactor while under vacuum at 50-70° C. during one hour and placed under argon (typically three cycles empty/argon have been carried out), the KF has been added under a flow of argon. The reactor is then closed then heated during one hour under inert atmosphere, then the tetraglyme and the $C_4F_sH_s$ are introduced in vacuo;
- when the liquid reagents have been introduced, the reactor is cooled by a methanol cooler thanks to its double envelope;
- the HFPO in gaseous form is added by double weighing;
- then the autoclave is connected with an outer bath and heated to 10° C. (before heating, the temperature of the reactor was of −20° C.);
- the polymerization is stopped at the end of 2-3 hours by adding 15-20 mL of methanol;
- the terminal groups are esterified in 1 h at 30° C.;
- after opening the reactor, the recovered product is washed in water in order to solubilize the excess Tetraglyme;
- the aqueous phase is then separated using a dropping funnel and the solvent (in the organic phase) is evaporated by rotating evaporator. The resulting product is colorless and viscous.

The quantitative values are as follows: the reactor is loaded with 0.41 g (7.1 mmol) of KF, 2.9 mL (13.2 mmol) of tetraglyme and 10 mL of $C_4F_5H_5$. Then 45 g (0.27 mol) of hexafluoropropene oxide are transferred to the reactor. The polymerization starts when the temperature is close to 0° C. and is stopped after 2 h by adding 15 mL of methanol. The polymer is washed three times with distilled water in order to remove the tetraglyme, the methanol and the catalyst. The solvents are evaporated using a rotating evaporator at 40-50° C. In this case, the yield is of 56%, the molar masses are of 1290 g/mol by NMR and 1207 by CPV.

Second, at the surface of the pyrogenic silica a hydrolysis-condensation is carried out by grafting onto the oligomers of the hexafluoropropene oxide (HFPO) with an alkoxysilane;

The quantitative values are as follows: 1.0 g of pyrogenic silica, vacuum dried beforehand during 2 h at 200° C., is dispersed in a water/ethanol solution (10/90, 100 mL). This dispersion is then placed under argon with a vigorous agitation during 15 minutes.

Then 2.6 g (1.7 mmol) of functionalized oligo(HFPO) amido (propyl) trimethoxysilane (HFPO$_x$-Si(OEt)$_3$) are added therein. The mixture is refluxed during 24 h at 80° C., then filtered and washed several times with distilled water. The white powder obtained (SiO$_2$—SiO$_y$-HFPO$_x$) is vacuum dried during 4 h at 80° C. until constant weight is reached.

By this method, it has been possible to prepare hydrophobic silica with a 130° contact angle.

In this case it is not possible to introduce this grafted silica in a PTFE-based dispersion (of CPC1A type where colloidal silica would have been replaced by this modified silica), the formulation precipitates and implementation in the form of a stable dispersion is not possible.

Example 1

It is sought to achieve a prime composition identical to the CPC1 composition, but by replacing the colloidal silica by a silica nanofiller according to the invention including a double coating composed of the HFPO oligomer and the polyethylene glycol (PEG) oligomer.

The grafting onto the pyrogenic silica of a "double strand" composed of a VDF oligomer functionalized by $Si(OEt)_3$ and a PEG oligomer functionalized by $Si(OEt)_3$ is carried out by hydrolysis-condensation. The purpose is to make compatible and thus increase the colloidal silica dispersion in PTFE coatings.

Synthesis of the VDF Oligomer

Use of a methoxy-PEG-triethoxysilane of formula $CH_3$—O—$(CH_2CH_2O)_9$—$(CH_2)_3$—$Si(Oet)3$ Provided by Specific Polymers and a Pyrogenic Silica: AEROSIL 150 from EVONIK

Example 1A

A Grafting of the Double Strand is Achieved Onto The Pyrogenic Silica by Method A (Illustrated on FIG. 2)

Silica is modified with fluorinated chains in a first step with the following conditions: 3.0 g of silica, vacuum dried beforehand during 2 h at 200° C., is dispersed in a water/ethanol solution (10-90, 150 mL). This dispersion is then placed under argon with a vigorous agitation during 15 minutes. Then, 1.26 g (1.8 mmol) of oligo(HEPO) functionalized amido(propyl) triethoxysilane ($HFPO_3$-$Si(OEt)_3$) are added therein. The mixture is refluxed during 24 h at 80° C., then filtered and washed several times with distilled water. The white powder obtained ($SiO_2$—$SiO_y$-$HFPO_3$) is vacuum dried during 4 h at 80° C. 1 g (1.8 mmol) $PEG_9$-$Si(OEt)_3$) were then grafted at the surface of the silica by using the same method of synthesis. A white powder is also recovered ($PEG_9$- $SiO_y$- $SiO_2$- $SiO_y$-$HFPO_x$) with x=3;

The HFPO/PEG ratio is such that the $PEG_5$- $SiO_y$- $SiO_2$- $SiO_y$-$HFPO_3$ has the following proportions: $[SiO_2]_0$: $[HFPO]_0$:$[PEG]_0$:100:5:5

This rate is optimized: it makes it possible to reduce the hydrophobicity of the silica with respect to comparative example 2.

In this case, the contact angle is of 86°±2: this makes it particularly possible to be able to consider an implementation of this silica in aqueous phase.

Example 1B

A Grafting on the Double Strand is Achieved Onto The Pyrogenic Silica by Method B (Illustrated on FIG. 2)

The method is similar to the previous one, the only difference relates to the simultaneous addition of the two types of strands to modify 1.00 g of silica 0.08 g (0.114 mmol) of $HFPO_3$-$Si(OEt)_3$ and 0.58 g (1.06 mmol) of $PEG_5$-$Si(OEt)_3$. The white powder obtained ($PEG_5$-$SiO_y$—$SiO_2$—$SiO_y$-$HFPO_3$)is vacuum dried during 4 h at 80° C.

Then a first prime composition is achieved according to the invention C1 by replacing the pyrogenic silica of CPC1B by this double grafted silica (according to example 1A or 1B), with the following quantity, replacing 1/1/p.

Then, typically one of the sides of the aluminum substrate is coated by composition C1, then the finishing composition CF1 (identical to that used in comparative example 1).

Substrates coated with a non-stick coating are obtained, wherein the double grafted silica is found in the prime layer. The thus obtained pieces then undergo the series of aforementioned tests of the present application.

The results obtained following these different tests are collected in table of results 1 hereinafter.

Example 2

This example is different from example 1 by a decrease in the rate of silica added to the formulation of type CPC1B, such that the quantity of silica described in example 1 is in a ratio with respect to the pyrogenic silica of 2/1/p.

The obtained results following these different tests are collected in table of results 1 hereinafter.

Example 3

It is sought to achieve a prime composition identical to composition CPC1, but by replacing the colloidal silica by a silica nanofiller according to the invention comprising a dual coating composed of VDF oligomer and ethylene glycol oligomer (PEG).

This grafting onto the pyrogenic silica of a "double strand" composed of VDF-$Si(OEt)_3$ and oligo(PEG) is carried out by hydrolysis-condensation.

The purpose is to make compatible and thus increase the dispersion of colloidal silica in PTFE coatings.

Synthesis of VDF Oligomer

The oligomerization of the VDF (vinylidene fluoride) has been achieved by a Hastelloy autoclave (HC 276) of 160 mL fitted with a manometer, a mechanical anchor in Hastelloy, a rupture disk (3000 PSI), and gas inlet and discharge valves. An electronic system has made it possible to regulate and control both the agitation and the temperature in the autoclave.

Before the reaction, the autoclave is pressurized at 30 nitrogen bars in order to check for the absence of leaks.

Then, the autoclave is conditioned based on various empty cycles ($10^{-2}$ mbar)/nitrogen in order to get rid of any traces of oxygen.

Then, liquid and solid reagents, dissolved in an appropriate solvent of polar type, not leading to any transfer reactions are introduced under vacuum into the autoclave (via a funnel):

2.00 g (or 0.005 mol) of di-tert-butyl peroxydicarbonate by way of initiator, for example the product commercialized under name Perkadox® 16S by AKZO NOBEL,
  3.34 g (or 0.0074 mol) of $C_6F_{13}I$ by way of transfer agent,
  80 mL of acetonitrile (solvent).

Then, the reactor is cooled and placed under vacuum before transferring therein, under vacuum, 20.2 g (or 0.316 mol) of gaseous vinylidene fluoride (VDF) by double weighting (that is to say by difference of masses of the autoclave before and after the introduction of VDF).

The reactor is gradually heated by stage up to the following temperatures 40° C. (around 10 minutes), 50° C. (around 20 minutes), and finally 60° C. (4 hours). At 60° C., the pressure is of 19 bars, then it drops to 1 bar after 4 hours of heating at this temperature.

After these 4 hours of heating at 60° C., the reactor is stopped, then cooled. It is immersed in ice during around 60 minutes then degassed and opened. A brown liquid mixture is obtained.

After evaporation of the solvent (here acetonitrile), the residue is dissolved in the acetone, then the oligomers thus produced are precipitated in methanol. They are filtered, dried then weighed: oligomers in the form of powder are obtained, whereas the filtrate (which contains telomeres of lesser molar masses) is evaporated then dried.

These two fractions are constituted of:

(1) 13.2 g of a yellow powder corresponding to higher molar masses (oligomers), and (2) 16.6 g of a brown wax (telomeres of low molar masses).

These two fractions are characterized by NMR spectroscopy of $^{19}F$ and $^{1}H$:

NMR of $^{1}H$ (acetone d6, ppm) δ: 3.75 (—$CF_2CF_2C\underline{H}_2I$, 2H); 3.50 (—$C\underline{H}_2CF_2I$, 2H); 3.30 (—$CF_2$—$CF_2C\underline{H}_2$—$CF_2C\underline{H}_2$—$CF_2$—, 2H); 2.80 (—$[CH_2$—$CF_2]nI$, 2nH); absence of the signal at 2.4 ppm Assigned to the inverse diades VDF-VDF tail-tail NMR of $^{19}F$ (acetone d6, ppm) δ: −39 (—$CH_2C\underline{F}_2I$, 2F); −82 ($C\underline{F}_3CF_2$—, 3F); −92 (—$[CF_2CH_2]n$, 2nF); normal additions head-tail; −109 (—$CF_2$—$C\underline{F}_2$—$CH_2$—I, 2F); −112 (—$CF_2$—$CF_2$—$(CF_2)x$-$C\underline{F}_2$—$CH_2$—) absence of signals at −113 and −116 ppm assigned to tail-tail inverse additions in the VDF-VDF diades; −122 to −124 ($CF_3$—$CF_2$—$(CF_2)x$-$CF_2$, 2F); −126 ($CF_3$—$C\underline{F}_2$—, 2F).

Functionalization of the VDF Oligomer

In a triple-neck flask provided with a cooler and a nitrogen inlet are successively introduced: 0.053 g (namely 0.00032 mol) of tert-butyl-peroxypivalate, 1.125 g (namely 0.0057 mole) of vinyltriethoxysilane, 10.02 g (namely 0.0029 mole) of aforementioned oligomer and 20 mL of dry acetonitrile.

The reactive mixture is heated during 4 hours at 74° C. After cooling, the triethoxysilane modified VDF oligomer is precipitated in dry pentane and filtered, then dried.

The NMR specter of $^{1}H$ and $^{19}F$ show the characteristic signals of VDF units and the end $CH_2CHISi$ $(OEt)_3$:

NMR of $^{1}H$ (acetone d6, ppm) disappearance of signals at 3.75 (—$CF_2CF_2C\underline{H}_2I$) and at 3.50 (—$C\underline{H}_2CF_2I$, 2H); presence of a multiple peak with center at 4.5 ppm, assigned to CHI and quadruplet and triplet towards 3.8 ppm and 1.2 ppm (respectively assigned at $OCH_2$ and $CH_3$); of signal at 3.30 (—$CF_2$—$CF_2C\underline{H}_2$—$CF_2C\underline{H}_2$—$CF_2$—, 2H); 2.80 (—$[C\underline{H}_2$-$CF_2]n$ and $CHIC\underline{H}_2VDF$).

NMR of $^{19}F$ (acetone d6, ppm) disappearance of signal at −39 (assigned to group —$CH_2CF_2I$, 2F); presence of groups at −82 ($C\underline{F}_3CF_2$—, 3F); −92 (—$[CF_2CH_2]n$, 2nF); −112 (–$CF_2$—$CF_2$—$(CF_2)x$-$CF_2$—$CH_2$—) and presence of signals between −122 and −124 ($CF_3$—$CF_2$—$(C\underline{F}_2)x$-$CF_2$, 2F); −126 ($CF_3$—$C\underline{F}_2$—, 2F).

Use of a Methoxy-PEG-triethoxysilane of Formula $CH_3$—O—$(CH_2CH_2O)_9$—$(CH_2)_3$—$Si(Oet)3$ Provided by Specific Polymers and a Pyrogenic Silica: AEROSIL 150 by EVONIK Example 3A A Grafting is Achieved of the Double Strand on The Pyrogenic Silica by Method A (Illustrated on FIG. 2).

Silica is modified by fluorinated chains in a first step with the following conditions: 3.0 g of silica, vacuum dried beforehand during 2 h at 200° C. is dispersed in a solution of water/ethanol (10/90, 150 mL).

This dispersion is then placed under argon with vigorous agitation during 15 minutes. Then 1.26 g (1.8 mmol) of (VDF) oligo functionalized by an amido(propyl) triethoxysilane ($HFPO_3$-$Si(OEt)_3$) are added therein.

The mixture is refluxed during 24 hours at 80° C. then filtered and washed several times with distilled water. The white powder obtained ($SiO_2$—$SiO_y$-$VDFx$) is vacuum dried during 4 h at 80° C. 1 g (1.8 mmol) of $PEG_9$-$Si(OEt)_3$) are then grafted onto the surface of the silica by using the same method of synthesis. A white powder is also recovered ($PEG_9$-$SiO_y$—$SiO_2$—$SiO_y$-$VDF_x$) with x=3;

The VDF/PEG ratio is such that the $PEG_5$-$SiO_y$—$SiO_2$—$SiO_y$-$VDF_3$ is in the proportions: $[SiO2]_0$:$[VDF]_0$:$[PEG]_0$: 100:5:5

This rate is optimized: it makes it possible to reduce the hydrophobia of the silica with respect to the comparative example 2.

In this case, the contact angle is of 86°±2: this particularly makes it possible to be able to consider implementing this silica in aqueous phase.

Example 3B

A Grafting of the Double Strand on The Pyrogenic Silica is Carried Out by Method B (Illustrated on FIG. 2)

The method is similar to the previous one, the only difference relating to the simultaneous addition of the two types of strands to modify 1.00 g of silica 0.08 g (0.114 mmol) of PVDF-$Si(OEt)_3$ and 0.58 g (1.06 mmol) of $PEG_5$-$Si(OEt)_3$. The white powder obtained ($PEG_5$-$SiO_y$—$SiO_2$—$SiO_y$-$HFPO_3$) is vacuum dried during 4 h at 80° C.

Then is achieved a prime composition according to the invention C3 by replacing the pyrogenic silica of CPC1B by this double grafted silica (according to example 3A or 3B), with the following quantity, replacement 1/1/p.

Then, one of the sides of the aluminum substrate is typically coated one by the composition C1, then the finishing composition CF1 (identical to that used in comparative example 1).

It is obtained substrates coated with a non-stick coating, wherein the double grafted silica is found in the prime layer. The thus, obtained pieces then undergo the series of aforementioned tests of the present application.

The results obtained following these different tests are collected in the table of results 1 hereinafter.

Example 4

This example is different from example IA by an increase in the size of the nanoparticles, which is here of the order of 1200 nm.

The results obtained following these different tests are collected in the table of results 1 hereinafter.

TABLE 1

| | Comparative example 1A | Comparative example 1B | Comparative example 2 | Example 1A | Example 1B | Example 2 | Example 3A | Example 3B | Example 4 |
|---|---|---|---|---|---|---|---|---|---|
| Feasibility of the implementation in aqueous phase | OK | Not Ok | Not ok | ok | ok | ok | ok | ok | ok |
| stability of the viscosity of a primer at ambient temperature | <30 days | — | — | >6 months | >6 months | >6 months | >6 months | >6 months | >4 months |
| stability of the viscosity of the primer at 40° C. | <10 days | — | — | >30 days | >30 days | >30 days | >30 days | >30 days | >15 days |
| Adherence test on a smooth aluminum substrate | Not ok | — | — | Ok | OK | OK | OK | OK | OK |
| Behavior under corrosion on smooth aluminum substrate | Bad 100% corrosion points | — | — | Ok 100% conform | Ok 100% conform | Ok 100% conform | Ok 100% conform | Ok 100% conform | Ok 100% conform |
| abrasion resistance on sanded aluminum substrate | Appearance of scratches on the metal: 1000 scrubbings Total loss of non-stick property 4000 scrubbings | — | — | Appearance of scratches on the metal: 11000 scrubbings Total loss of non-stick property 20000 scrubbings | Appearance of scratches on the metal: 15000 scrubbings Total loss of non-stick property 25000 scrubbings | Appearance of scratches on the metal: 7000 scrubbings Total loss of non-stick property 16000 scrubbings | Appearance of scratches on the metal: 13000 scrubbings Total loss of non-stick property 19000 scrubbings | Appearance of scratches on the metal: 13000 scrubbings Total loss of non-stick property 19000 scrubbings | Appearance of scratches on the metal: 10000 scrubbings Total loss of non-stick property 14000 scrubbings |

The invention claimed is:

1. A nanofiller of a metal-oxide comprising at least two graft chains, at least one of the chains being hydrophilic and the other being a hydrophobic chain compatible with fluorinated polymers,
    wherein the hydrophilic chain is a derivative of polyalkylene glycol modified by:
        either an alkoxysilane,
        or a phosphonic acid or ester,
        or a phosphinic acid or ester,
        or a carboxylic acid, and
    wherein the hydrophobic chain is an oligomer, the weight-average molar mass Mw of which is between 300 and 20,000 g/mol.

2. The nanofiller according to claim 1, wherein the hydrophobic chain is an oligomer, the weight-average molar mass Mw of which is between 500 and 10,000 g/mol.

3. The nanofiller according to claim 2, wherein the hydrophobic chain is an oligomer, the weight-average molar mass Mw of which is between 1000 and 5000 g/mol.

4. The nanofiller according to claim 1, wherein the metal oxide is selected among the group constituted of silica, alumina, cerium oxide, zinc oxide, vanadium oxide, zirconium oxide, and titanium dioxide.

5. The nanofiller according to claim 4, wherein the metal oxide is silica, colloidal silica or pyrogenic silica.

6. The nanofiller according to claim 5, wherein it is constituted of silica comprising two graft chains:
    one of the chains being a hydrophilic chain consisting in a derivative of polyethylene glycol modified by a triethoxysilane, and
    the other chain being an oligomer of the hexafluoropropylene oxide (HFPO) modified by a triethoxysilane or a methyldiethoxysilane.

7. The nanofiller according to claim 1, wherein the polyalkylene glycol derivative is a polyethylene-glycol (PEG) derivative or a polypropylene glycol (PPG) derivative.

8. The nanofiller according to claim 1, wherein the hydrophilic chain is a derivative of polyethylene glycol modified by an alkoxysilane.

9. The nanofiller according to claim 1, wherein the hydrophobic chain or chains is (or are) an oligomer of hexafluoropropylene oxide (HFPO), of vinylidene fluoride (VDF), of tetrafluoroethylene (TFE) or co-oligomers VDF-TFE, VDF-hexdfluoropropylene, VDF- chlorotrifluoroethylene, alone or in mixtures and modified by an alkoxysilane.

* * * * *